United States Patent
Yoshino et al.

(10) Patent No.: US 10,012,269 B2
(45) Date of Patent: Jul. 3, 2018

(54) MESHING-TYPE ENGAGEMENT DEVICE

(71) Applicant: TOYOTA JIDOSHA KABUSHIKI KAISHA, Toyota-shi (JP)

(72) Inventors: Hirotsugu Yoshino, Susono (JP); Motoki Tabuchi, Mishima (JP); Takaho Kawakami, Susono (JP); Seiji Kuwahara, Susono (JP); Isamu Shiotsu, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 233 days.

(21) Appl. No.: 15/058,873

(22) Filed: Mar. 2, 2016

(65) Prior Publication Data

US 2016/0258492 A1    Sep. 8, 2016

(30) Foreign Application Priority Data

Mar. 2, 2015 (JP) ................................. 2015-040133

(51) Int. Cl.
*F16D 11/14* (2006.01)
*F16D 25/061* (2006.01)
*F16D 23/12* (2006.01)

(52) U.S. Cl.
CPC .............. *F16D 11/14* (2013.01); *F16D 23/12* (2013.01); *F16D 25/061* (2013.01)

(58) Field of Classification Search
None
See application file for complete search history.

(56) References Cited

U.S. PATENT DOCUMENTS

| 4,373,481 A * | 2/1983 | Kruger | F16D 25/08 |
| | | | 123/198 F |
| 8,905,212 B2 * | 12/2014 | Vierk | F16D 11/14 |
| | | | 192/53.1 |
| 2007/0240955 A1 | 10/2007 | Zenno | |
| 2011/0108384 A1 | 5/2011 | Reisch et al. | |
| 2016/0281792 A1 * | 9/2016 | Shiotsu | F16D 25/02 |

FOREIGN PATENT DOCUMENTS

| CN | 102007313 A | 4/2011 |
| DE | 10 2008 001 197 A1 | 10/2009 |
| JP | 1-500923 A | 3/1989 |
| JP | 2007-285448 | 11/2007 |
| JP | 2008-215503 A | 9/2008 |
| JP | 2011-518291 A | 6/2011 |
| JP | 2014-98459 | 5/2014 |

* cited by examiner

*Primary Examiner* — Jacob S. Scott
(74) *Attorney, Agent, or Firm* — Oblon, McClelland, Maier & Neustadt, L.L.P.

(57) ABSTRACT

A meshing-type engagement device includes a first member, a second member, a pressing mechanism, and a reaction force mechanism. The first member is provided with a plurality of first dog teeth. The second member is provided with a plurality of second dog teeth. The pressing mechanism is configured to press the first member to the second member side. The reaction force mechanism is configured to generate a reaction force with respect to a pressing force pressing the first member for the first dog teeth and the second dog teeth to mesh with each other such that the amount of increase in the reaction force with respect to a movement of the first member is larger at a position further on the second member side than a predetermined position compared to the amount of increase to the predetermined position when the first member is pressed.

6 Claims, 5 Drawing Sheets

| GEAR | C1 | C2 | C3 | C4 | B1 | B2 |
|---|---|---|---|---|---|---|
| 1st | O | – | – | – | – | O |
| 2nd | O | – | – | – | O | – |
| 3rd | O | – | O | – | – | – |
| 4th | O | – | – | O | – | – |
| 5th | O | O | – | – | – | – |
| 6th | – | O | – | O | – | – |
| 7th | – | O | O | – | – | – |
| 8th | – | O | – | – | O | – |
| Revs1 | – | – | O | – | – | O |
| Revs2 | – | – | – | O | – | O |

MESHING-TYPE ENGAGEMENT DEVICE

INCORPORATION BY REFERENCE

The disclosure of Japanese Patent Application No. 2015-040133 filed on Mar. 2, 2015 including the specification, drawings and abstract is incorporated herein by reference in its entirety.

BACKGROUND OF THE INVENTION

1. Field of the Invention

The invention relates to a meshing-type engagement device that connects two members to be capable of torque transmission by dog teeth meshing with each other.

2. Description of Related Art

Japanese Patent Application Publication No. 2014-98459 (JP 2014-98459A) discloses a meshing-type engagement device that is configured to connect a clutch hub and a clutch ring to each other by a cylindrical sleeve meshing with the clutch hub which is connected to a rotary shaft and the clutch ring which is connected to an output shaft to be capable of torque transmission. This meshing-type engagement device is configured to switch between engagement and release by the sleeve being moved in an axial direction by an actuator. When the meshing-type engagement device is engaged, the sleeve is moved to a position achieved immediately before the sleeve and the clutch ring mesh with each other, and then the sleeve is temporarily stopped. Then, the sleeve is moved to be allowed to mesh with the clutch ring. Hemispherical projection portions are formed in the sleeve and the clutch ring. The projection portions are formed at a position of contact in a case where the sleeve and the clutch ring rotate relative to each other with the sleeve moved to the position achieved immediately before the beginning of the meshing between the sleeve and the clutch ring. Accordingly, whether or not the sleeve is moved to the position achieved immediately before beginning to mesh with the clutch ring is determined by a stroke sensor detecting the projection portions being in contact with each other and the sleeve being pushed back.

Japanese Patent Application Publication No. 2007-285448 (JP 2007-285448 A) discloses a transmission in which a friction-type engagement device is disposed on the upstream side of a power transmission path and a meshing-type engagement device is disposed on its downstream side. This transmission is configured to set a predetermined gear by engaging the meshing-type engagement device after releasing the friction-type engagement device and then engaging the friction-type engagement device. This friction-type engagement device is engaged by a friction plate being pressed by a piston. The piston is configured to be moved to a position between the position of the piston where the friction-type engagement device is in a so-called half-engaged state and the position of the piston where the friction-type engagement device is in a state of complete release when the friction-type engagement device is temporarily released as described above. The position of the piston is detected by a stroke sensor.

SUMMARY OF THE INVENTION

In a meshing-type engagement mechanism, respective meshing teeth are largely separated from each other in a release state. This is to avoid contact between the meshing teeth attributable to vibration, an assembly error, or the like. Accordingly, in the case of engagement, the meshing teeth begin to mesh with each other after the separation distance is clogged. A movement for clogging this separation distance is called idle running, and idle running time causes an engagement delay. In the device that is disclosed in Japanese Patent Application Publication No. 2014-98459 (JP 2014-98459 A), the position achieved immediately before the beginning of the meshing between the respective teeth can be detected by the stroke sensor, but the movement (idle running) to the position achieved immediately before the engagement cannot be accelerated and the time of the movement cannot be shortened. Accordingly, there is room for improvement regarding the engagement response of the meshing-type engagement mechanism.

The invention has been made in view of the above-described technical problem, and an object thereof is to provide a meshing-type engagement device that is capable of improving engagement response by shortening the operation time taken for meshing teeth to begin to mesh with each other.

A meshing-type engagement device according to an aspect of the invention includes a first member, a second member, a pressing mechanism, and a reaction force mechanism. The first member is provided with a plurality of first dog teeth. The plurality of first dog teeth are placed at regular intervals in a circumferential direction of the first member. The second member is provided with a plurality of second dog teeth. The plurality of second dog teeth are placed at regular intervals in a circumferential direction of the second member. The pressing mechanism is configured to press the first member to the second member side such that the first dog teeth are inserted between and mesh with the second dog teeth when the first member is pressed. The reaction force mechanism is configured to generate a reaction force with respect to a pressing force pressing the first member for the first dog teeth and the second dog teeth to mesh with each other such that an amount of increase in the reaction force with respect to a movement of the first member is larger at a position further on the second member side than a predetermined position compared to the amount of increase to the predetermined position when the first member is pressed. The predetermined position is a position achieved until the respective dog teeth begin to mesh with each other after the first member is pressed and begins to be moved toward the second member side.

In the meshing-type engagement device according to the aspect described above, the reaction force mechanism may have a first elastic member causing an elastic force to act on the first member regardless of the position of the first member and a second elastic member in contact with the first member and causing an elastic force to act on the first member in a case where the first member is moved to the predetermined position.

The meshing-type engagement device according to the aspect described above is configured to allow the respective dog teeth to mesh with each other by the first member being pressed by the pressing mechanism. In addition, the reaction force mechanism is provided to generate the reaction force with respect to the pressing force attributable to the pressing mechanism. This reaction force mechanism is configured such that the amount of increase in the reaction force with respect to the movement of the first member is larger at the position further on the second member side than the predetermined position compared to the amount of increase to the predetermined position at the predetermined position achieved between the beginning of the movement of the first member and the beginning of the meshing between the respective dog teeth. Accordingly, when the first member is pressed by the pressing mechanism so that the first member is moved to the predetermined position, an excessive movement of the first member can be suppressed even when the pressing force attributable to the pressing mechanism varies in a direction of increase. In other words, an excessive approach of the respective dog teeth can be suppressed. Accordingly, the first member can be pressed with a relatively high level of pressing force, and thus the operation time of the first member taken for the respective dog teeth to begin to mesh with each other can be shortened. In other words, engagement response can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 4:
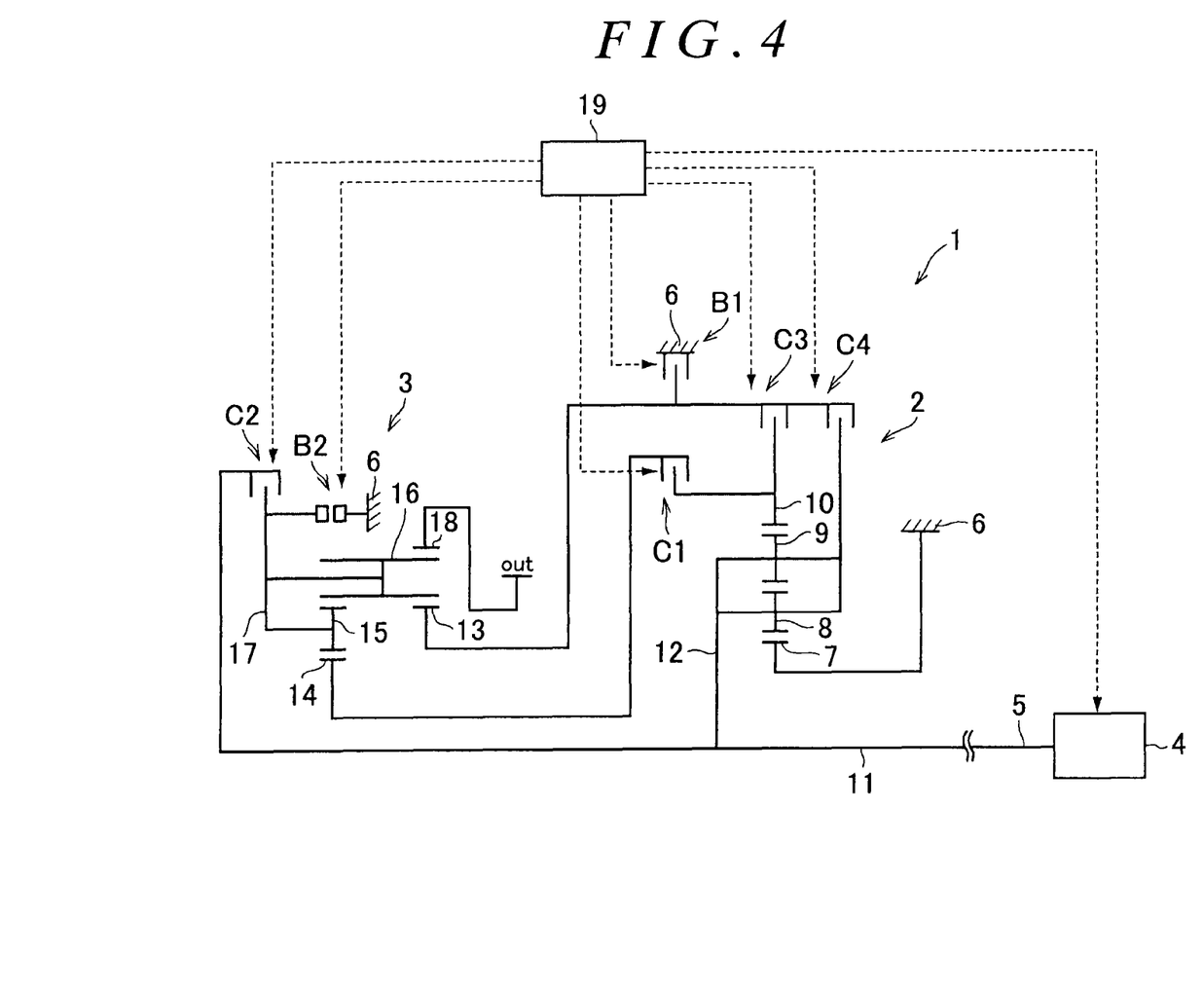
FIG. 4 is a skeleton diagram illustrating an example of a transmission according to the invention.

An example of a transmission that is provided with a meshing-type engagement device according to the invention is illustrated in FIG. 4. This transmission 1, which is mounted in a vehicle, has a known double pinion-type planetary gear mechanism (hereinafter, referred to as a first planetary gear mechanism) 2 and a Ravigneaux-type planetary gear mechanism (hereinafter, referred to as a second planetary gear mechanism) 3. This transmission 1 is connected, via a torque converter (not illustrated), to an output shaft 5 of an engine 4 that is a driving force source. In addition, this transmission 1 is configured to be capable of setting gears of a forward first speed to a forward eighth speed and gears of a reverse first speed and a reverse second speed, and sets one of the gears in accordance with a target rotational speed of the engine 4, a required driving force, or the like.

The first planetary gear mechanism 2 is configured to have a first sun gear 7 that is connected to a case 6, a first inner pinion gear 8 that meshes with the first sun gear 7, a first outer pinion gear 9 that meshes with the first inner pinion gear 8, a first ring gear 10 that meshes with the first outer pinion gear 9, and a first carrier 12 that holds the first inner pinion gear 8 and the first outer pinion gear 9 to be capable of rotation and revolution and is connected to an input shaft 11. In other words, the first planetary gear mechanism 2 is a differential mechanism that has three rotating elements, in which the first carrier 12 is configured to function as an input element, the first sun gear 7 is configured to function as a reaction force element, and the first ring gear 10 is configured to function as an output element in a case where the engine 4 outputs a driving force.

In addition, since the first sun gear 7 is connected to the case 6 as described above, the first planetary gear mechanism 2 functions as a speed reducer.

The second planetary gear mechanism 3 is configured to have a second sun gear 13 and a third sun gear 14 that are placed concentrically with the input shaft 11, a second inner pinion gear 15 that meshes with the third sun gear 14, a second outer pinion gear 16 that meshes with the second inner pinion gear 15 and the second sun gear 13, a second carrier 17 that holds the second inner pinion gear 15 and the second outer pinion gear 16 to be capable of rotation and revolution, and a second ring gear 18 that meshes with the second outer pinion gear 16. In other words, the second planetary gear mechanism 3 is a differential mechanism that is configured to share the two rotating elements of a single pinion-type planetary gear mechanism and a double pinion-type planetary gear mechanism and has the four rotating elements of the second sun gear 13, the third sun gear 14, the second carrier 17, and the second ring gear 18.

These respective gears 7, 8, 9, 10, 13, 14, 15, 16, 18 are helical gears that can suppress abnormal noise generation during torque transmission, and torsion angles thereof are determined such that a play of the second carrier 17 is clogged in a direction in which respective dog teeth (described later) are separated by torque being transmitted for a rotational speed of the second carrier 17 to be reduced during a shift from a forward second speed (described later) to the forward first speed.

A plurality of clutches that allow selective engagement between the respective rotating elements of the first planetary gear mechanism 2 and the respective rotating elements of the second planetary gear mechanism 3 and brakes that stop either one of the rotating elements are disposed as well. Specifically, a first clutch C1 is disposed to connect the first ring gear 10 and the third sun gear 14 to each other, a second clutch C2 is disposed to connect the input shaft 11 or the first carrier 12 to the second carrier 17, a third clutch C3 is disposed to connect the first ring gear 10 and the second sun gear 13 to each other, and a fourth clutch C4 is disposed to connect the first carrier 12 and the second sun gear 13 to each other. Each of these clutches C1, C2, C3, C4 is configured similarly to a known friction clutch, and can change a transmission torque capacity based on a hydraulic actuator control amount.

A first brake B1 that stops the second sun gear 13 is disposed by the second sun gear 13 being connected to the case 6. Likewise, a second brake B2 that stops the second carrier 17 is disposed by the second carrier 17 being connected to the case 6. This first brake B1 is configured similarly to a known friction brake. The first brake B1 can control a braking force that acts on the second sun gear 13 by changing a transmission torque capacity. This transmission torque capacity is changed by an oil pressure of a hydraulic actuator (not illustrated) being controlled. The second brake B2 is the meshing-type engagement device that is configured to stop the second carrier 17 by causing the respective dog teeth (described later) to mesh with each other and the second carrier 17 and the case 6 to be connected to each other. The transmission torque capacity of each of the clutches C1, C2, C3, C4 and the first brake B1 may be controlled by an electromagnetic actuator, and means to this end is not limited.

Additionally, an electronic control unit (hereinafter, referred to as an ECU) 19 is disposed to control the engine 4, each engagement device, and the like. This ECU 19 is configured to have a microcomputer as its main component as is the case with known ECUs. In addition, this ECU 19 is configured to receive signal inputs from sensors (not illustrated) and output signals to the engine 4 and each engagement device based on the input signals, a map and an arithmetic expression that are stored in advance, and the like. For example, signals of a vehicle speed that is detected by a vehicle speed sensor and an accelerator opening degree that is detected by an accelerator opening degree sensor are input to the ECU 19. A shift map, which is prepared in advance and uses the vehicle speed and the accelerator opening degree as parameters as is known, is stored in the ECU 19, and the gear is determined based on the input signals and the shift map. Then, a signal corresponding to the determined gear is output to each of the clutches C1, C2, C3, C4 and the brakes B1, B2.

Figure 5:
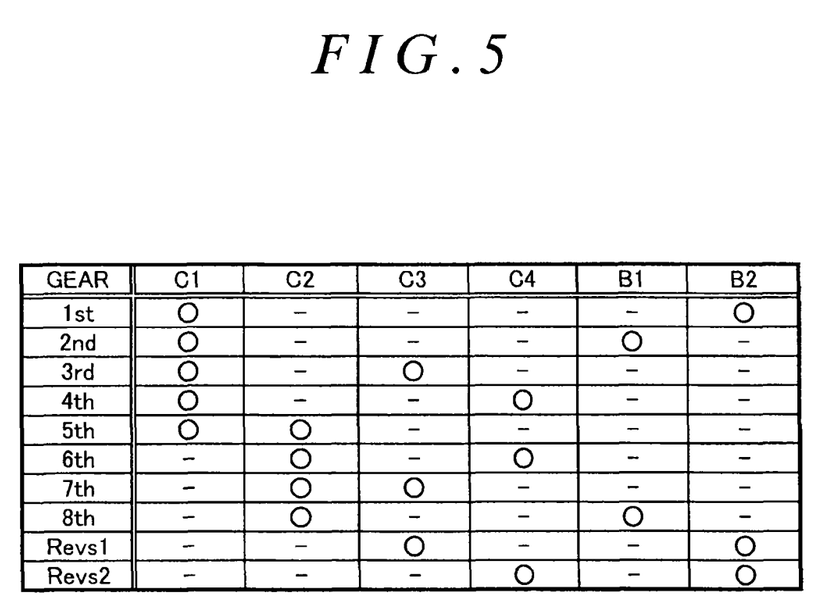
FIG. 5 is a chart illustrating engagement mechanisms that are engaged for respective gears to be set.

Engagement mechanisms that are engaged for the setting of the respective gears are illustrated in FIG. 5. "o" in FIG. 5 shows a state of clutch or brake engagement, and "–" shows a state of clutch or brake release. As illustrated in FIG. 5, the forward first speed is set when the first clutch C1 and the second brake B2 are engaged. The forward second speed is set when the first clutch C1 and the first brake B1 are engaged. A forward third speed is set when the first clutch C1 and the third clutch C3 are engaged. A forward fourth speed is set when the first clutch C1 and the fourth clutch C4 are engaged. A forward fifth speed is set when the first clutch C1 and the second clutch C2 are engaged. A forward sixth speed is set when the second clutch C2 and the fourth clutch C4 are engaged. A forward seventh speed is set when the second clutch C2 and the third clutch C3 are engaged. The forward eighth speed is set when the second clutch C2 and the first brake B1 are engaged. In addition, the reverse first speed is set when the second brake B2 and the third clutch C3 are engaged, and the reverse second speed is set when the second brake B2 and the fourth clutch C4 are engaged.

According to this configuration, a maximum gear ratio is achieved when the forward first speed is set, and a minimum gear ratio is achieved when the forward eighth speed is set. In addition, the gear ratio is "1" when the forward sixth speed is set.

A control example regarding a shift from the forward second speed to the forward first speed of this transmission 1 will be briefly explained. As described above, the first clutch C1 is engaged at the forward first speed and the forward second speed. Accordingly, during the shift to the forward first speed, the second brake B2 is engaged with the first brake B1 released and the first clutch C1 engaged. In this case, the transmission torque capacity of the first brake B1 and an output torque of the engine 4 are subjected to cooperative control, so that the rotational speed of the second carrier 17 becomes close to "0". Then, the second brake B2 is engaged, and then the first brake B1 is completely released.

In order to shorten the time taken for the engagement of the second brake B2 described above, it is preferable that the second brake B2 is controlled to be put into a state immediately preceding engagement during the course of the control of the rotational speed of the second carrier 17. This state immediately preceding the engagement of the second brake B2 means a state where the second brake B2 is not engaged unintentionally, which takes a component variation or the like into account. In addition, according to this configuration, the play of the second carrier 17 is clogged in the direction in which the respective dog teeth (described later) are separated by the torque being transmitted for the rotational speed of the second carrier 17 to be reduced as described above. Accordingly, in a case where the second brake B2 is in the state immediately preceding the engagement, an axial movement of the second carrier 17 due to vibration or the like does not have to be taken into account and the gap of the respective dog teeth in this state is determined to be narrower than in a state where the second brake is completely released.

Figure 1:
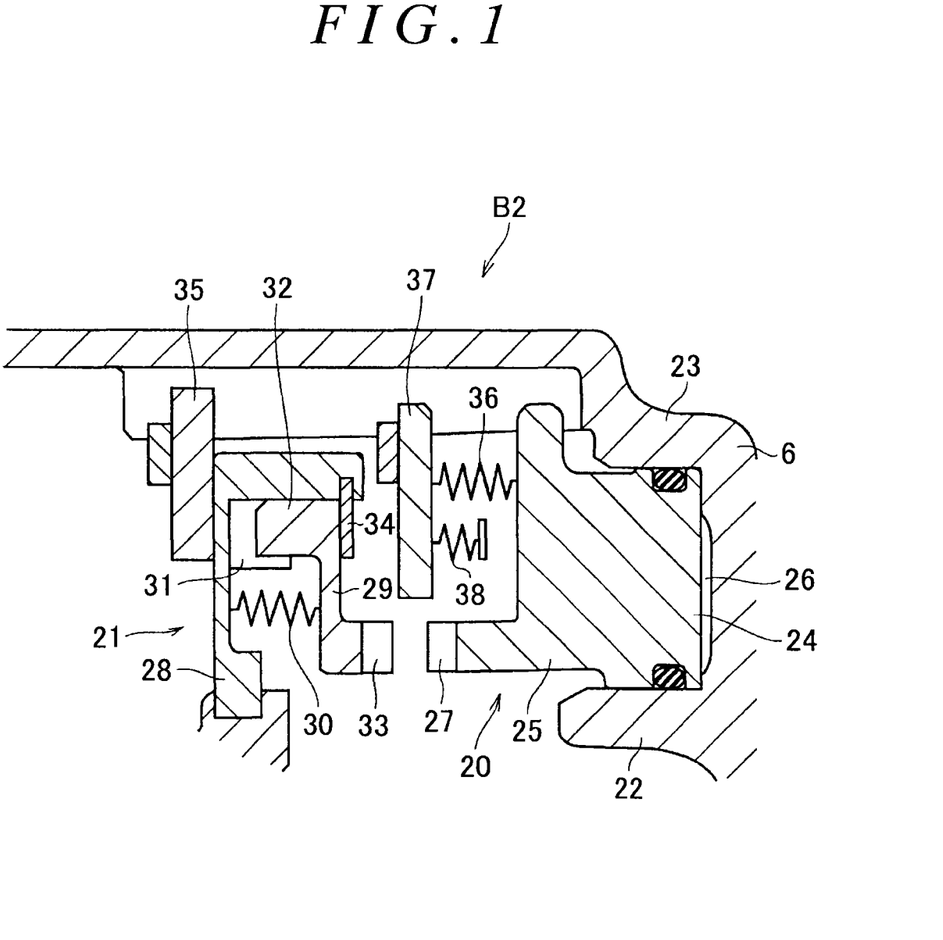
FIG. 1 is a sectional view for showing an example of a meshing-type engagement device according to the invention.

FIG. 1 shows an example of a configuration that allows the second brake B2 to be in the state immediately preceding the engagement as described above. This second brake B2 is configured to stop the second carrier 17 from rotating by allowing a first piston 20 and a rotary member 21 to be engaged with each other. The first piston 20 is connected to the case 6 in a non-rotatable manner, and the rotary member 21 rotates integrally with the second carrier 17.

The first piston 20 has an annular shape, and one end portion (hereinafter, referred to as a fitted portion) 24 of the first piston 20 is fitted between a first cylindrical portion 22 and a second cylindrical portion 23. The first cylindrical portion 22 axially protrudes from a side surface of the case 6, and the second cylindrical portion 23 is formed by an outer peripheral portion of the side surface of the case 6 being bent. A part 25 that axially protrudes from the fitted portion 24 is larger in outer diameter than the fitted portion 24, and an outer peripheral surface of the part 25 and an inner wall surface of the case 6 are in spline engagement. In other words, the first piston 20 is engaged with the case 6 in a non-rotatable manner and to be capable of moving in an axial direction.

An annular groove 26 is formed in the side surface of the case 6 so that there is a gap between an end face of the fitted portion 24 and the side surface of the case 6 in a case where the first piston 20 is moved closest to the side surface side of the case 6. The groove 26 and an oil pressure source (not illustrated) communicate with each other via an oil passage. Accordingly, when oil is supplied from the oil pressure source to the groove 26, a load based on the oil pressure causes the first piston 20 to be pressed in a direction away from the side surface. In other words, the case 6 and the first piston 20 constitute a hydraulic actuator, the hydraulic actuator that has this configuration corresponds to the "pressing mechanism" according to the example of the invention, and the first piston 20 corresponds to the "first member" according to the example of the invention. In the following description, the groove 26 will be referred to as a hydraulic chamber 26. First dog teeth 27 that protrude in the axial direction are formed in an end portion of the first piston 20 on the side opposite to the fitted portion 24. These first dog teeth 27 are plurally formed at predetermined intervals in a circumferential direction.

The rotary member 21 corresponds to the "second member" according to the example of the invention. The rotary member 21 is configured to have a holding member 28, an annular second piston 29, and an elastic member 30. The holding member 28 is connected to the second carrier 17 and has a bottomed cylindrical shape. The second piston 29 is accommodated inside the holding member 28 to be capable of moving in the axial direction. The elastic member 30 allows an elastic force to act in a direction in which the second piston 29 is separated from a bottom surface of the holding member 28. A detent portion 31 that protrudes in the axial direction is formed at predetermined intervals in the circumferential direction in an outer peripheral portion of the bottom surface of the holding member 28. A projection portion 32, which is engaged with the detent portion 31 in the circumferential direction, is formed in one end portion of the second piston 29. Accordingly, torque of the second carrier 17 is transmitted to the second piston 29 via the detent portion 31. In addition, second dog teeth 33, which protrude in the axial direction, are formed on a side surface on the other side of the second piston 29. These second dog teeth 33 are plurally formed at predetermined intervals in the circumferential direction. The second dog teeth 33 are configured such that the first dog teeth 27 are inserted between the adjacent second dog teeth 33.

As described above, a pressing force resulting from the oil pressure of the hydraulic chamber 26 causes the first piston 20 to be pressed and the respective dog teeth 27, 33 to mesh with each other. In a case where tooth tips of the respective dog teeth 27, 33 are in contact with each other while the respective dog teeth 27, 33 mesh with each other, the elastic member 30 is compressed and the second dog teeth 33 move in a direction away from the first dog teeth 27. In other words, the first dog teeth 27 and the second dog teeth 33 rotate relative to each other by a reaction force acting on the tooth tips of the first dog teeth 27 being reduced and a frictional force being reduced, and then the respective dog teeth 27, 33 can mesh with each other. In the illustrated example, a snap ring 34 is disposed inside an opening portion of the holding member 28 so that the second piston 29 is prevented from escaping from the opening portion of the holding member 28. In addition, an annular positioning member 35 for limiting an axial movement of the holding member 28 is connected to the case 6 to be in contact with the bottom surface of the holding member 28, and the play is clogged for the holding member 28 to be brought into contact with the positioning member 35 when the torque is transmitted so that the rotational speed of the second carrier 17 is reduced.

Figure 2:
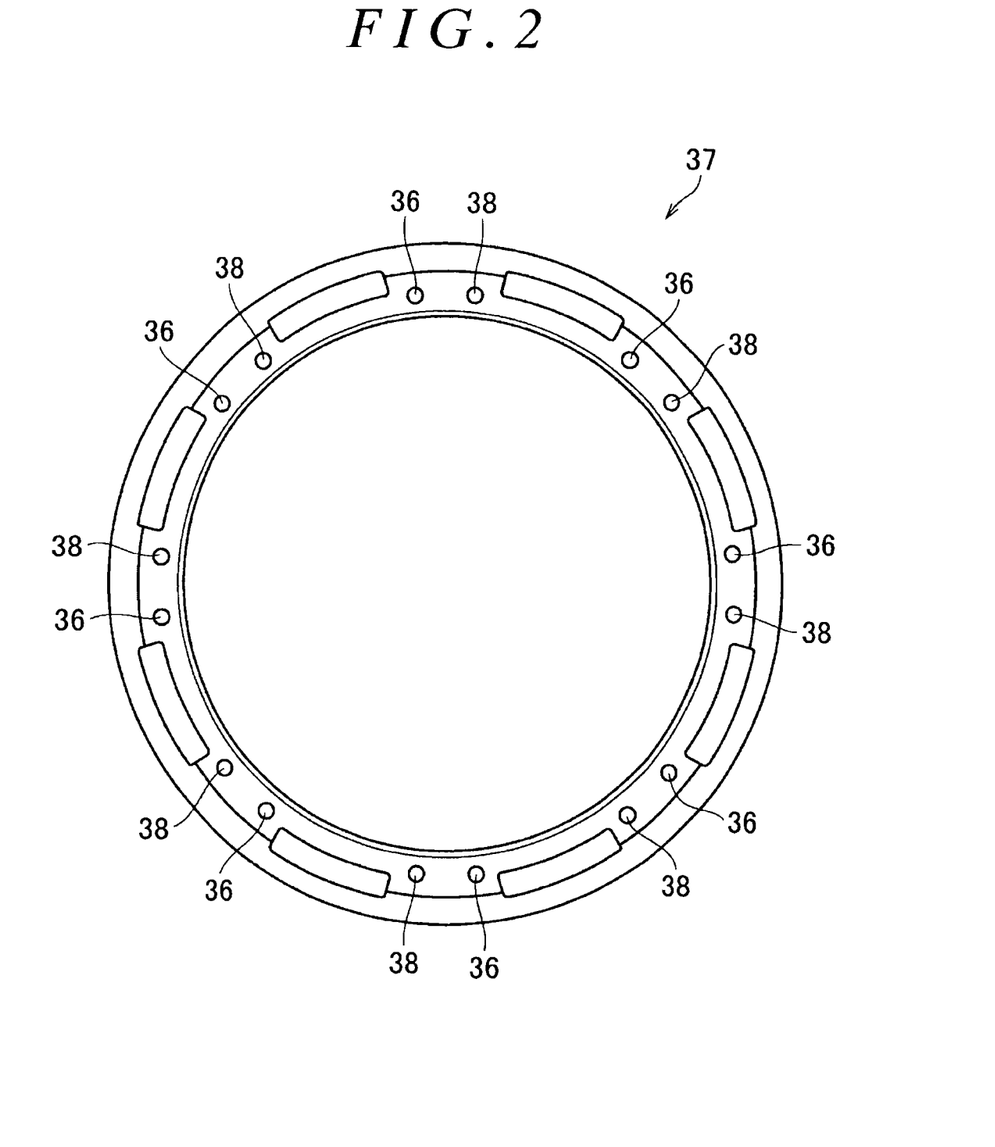
FIG. 2 is a drawing illustrating positions where respective return springs are mounted on a spring seat.

Additionally, a first return spring 36 is disposed so that the respective dog teeth 27, 33 are separated by the oil pressure of the hydraulic chamber 26 being reduced. Specifically, the first return spring 36 is disposed in a state of being compressed by an annular spring seat 37 that is connected to the case 6 and a side surface of the first piston 20, and one end portion of the first return spring 36 is connected to the spring seat 37. Accordingly, the first return spring 36 is configured to allow an elastic force (reaction force) against the load pressing the first piston 20 based on the oil pressure of the hydraulic chamber 26 to act on the first piston 20 at all times. A plurality of the first return springs 36 may be placed at predetermined intervals in the circumferential direction of the spring seat 37 as illustrated in FIG. 2, and the first return springs 36 may also be a single annular spring.

Additionally, second return springs 38 are disposed to be in contact with the side surface of the first piston 20 in a case where the first piston 20 is moved to a position (predetermined position) achieved immediately before the beginning of the meshing between the respective dog teeth 27, 33 and to be compressed along with the first return spring 36 in a case where the first piston 20 is further moved for the respective dog teeth 27, 33 to mesh with each other. This second return spring 38 is a coil spring that has one end portion connected to the spring seat 37 and is shorter than the first return spring 36. In addition, the second return springs 38 may be placed at predetermined intervals in the circumferential direction and may also be a single annular spring as with the first return spring 36 described above. FIG. 2 shows an example in which the first return springs 36 and the second return springs 38 are alternately placed in the circumferential direction. FIG. 1 shows an example in which the second return spring 38 is disposed on an inner peripheral side of the spring seat 37 more than the first return spring 36 is. In addition, in a case where a plurality of the first return springs 36 are disposed in the circumferential direction, the second return springs 38 may be placed in central portions of the respective first return springs 36. In other words, each of the return springs 36, 38 may be placed so that a central axis of the first return spring 36 and a central axis of the second return spring 38 correspond to each other. The first return spring 36 and the second return spring 38 correspond to the "reaction force mechanisms" according to the example of the invention.

Figure 3:
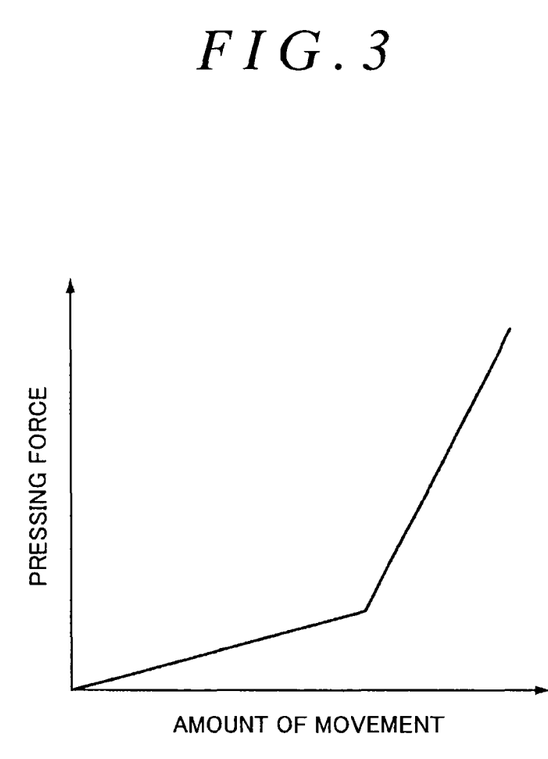
FIG. 3 is a diagram illustrating the amount of movement of a first piston and the magnitude of a pressing force that is required to move the first piston.

FIG. 3 shows the magnitude of the pressing force that is required for the first piston 20 to be moved in a direction away from the side surface of the case 6. The horizontal axis in FIG. 3 represents the amount of movement of the first piston 20, and the vertical axis in FIG. 3 represents the magnitude of the pressing force. As illustrated in FIG. 3, in a case where the first piston 20 is positioned on the side surface side of the case 6, only the elastic force of the first return spring 36 acts on the first piston 20. Accordingly, the amount of increase in the pressing force that is required for the first piston 20 to be moved by a unit distance is a magnitude equivalent to the elastic modulus of the first return spring 36.

When the first piston 20 is moved to the position (predetermined position) achieved immediately before the meshing between the respective dog teeth 27, 33, an end face of the second return spring 38 is in contact with the side surface of the first piston 20. Accordingly, for the first piston 20 to be further moved, the pressing force that is required for the movement of the first piston 20 rapidly increases as each of the return springs 36, 38 is compressed. In other words, in a case where the first piston 20 is moved by a predetermined amount or more, the amount of increase in the pressing force that is required for the first piston 20 to be moved by the unit distance becomes a magnitude equivalent to the sum of the elastic moduli of the respective return springs 36, 38. In other words, the amount of increase in the reaction force with respect to the movement of the first piston 20 during the pressing of the first piston 20 increases at a position further on the rotary member 21 side than the predetermined position compared to the amount of increase to the predetermined position. Accordingly, the amount of movement of the first piston 20 resulting from a minute change in the pressing force decreases.

The above-described configuration of the second brake B2 allows the first piston 20 to be moved to the position in contact with the second return spring 38 in a case where the first piston 20 is pressed to reach the position achieved immediately before the engagement between the respective dog teeth 27, 33. The pressing force that is required at this time can be obtained based on the amount of compression of the first return spring 36. Accordingly, in a case where the second brake B2 is engaged, the oil pressure that is obtained as described above is supplied to the hydraulic chamber 26 to the position where the first piston 20 is in contact with the second return spring 38, and then the respective dog teeth 27, 33 are engaged by the oil pressure being further increased after the rotational speed of the second carrier 17 is reduced to the rotational speed at which the second brake B2 can be engaged.

In a case where the second return spring 38 is compressed as described above, the amount of increase in the reaction force with respect to the movement of the first piston 20 increases, and thus the movement of the respective dog teeth 27, 33 causing an excessive approach can be suppressed even when the pressing force pressing the first piston 20 for the first piston 20 to come into contact with the second return spring 38 varies in a direction of increase. In other words, the first piston 20 can be stopped at the position in contact with the second return spring 38. Accordingly, a control for reducing the oil pressure in accordance with the position of the first piston 20 or the like so as to suppress an excessive movement of the first piston 20 resulting from the inertia of the first piston 20 or the like does not have to be performed. Accordingly, in a case where the first piston 20 is moved to the position achieved immediately before the meshing between the respective dog teeth 27, 33, the first piston 20 can be pressed with a relatively high level of pressing force, and thus the time taken for the movement of the first piston 20 can be shortened. As a result, engagement response can be improved.

Because a sensor for detecting the position of the first piston 20 does not have to be disposed at all and the oil pressure does not have to be controlled based on a signal of such a sensor, the control for moving the first piston 20 to the position achieved immediately before the meshing between the respective dog teeth 27, 33 can be simplified.

When the first piston 20 is moved to the predetermined position determined in advance, the amount of increase in the reaction force with respect to the movement of the first piston 20 may be larger at the position further on the rotary member 21 side than the predetermined position compared to the amount of increase to the predetermined position. For example, tooth flanks of spline teeth may be formed such that the sliding frictional resistance of a part where the first piston 20 and the case 6 are in spline engagement increases.

In addition, the pressing mechanism according to the invention is not limited to the hydraulic actuator. The pressing mechanism according to the invention may be another one such as an electromagnetic actuator. Furthermore, the invention is not limited to the configuration in which the two elastic members of the first return spring 36 and the second return spring 38 cause the elastic force to act on the first piston 20. Specifically, the first piston 20 may be pressed by a single elastic body that is configured to have a different elastic modulus through a change in wire diameter, effective number of turns, coil diameter, or the like so that a relatively small elastic force acts from the beginning of the movement of the first piston 20 to the position achieved immediately before the meshing between the respective dog teeth 27, 33 and a relatively large elastic force acts while the first piston 20 is further moved to the rotary member 21 side. Moreover, the reaction force mechanism according to the invention is not limited to the spring, and one using rubber and a hydraulic cylinder may be used instead. In addition, the meshing-type engagement device according to the invention is not limited to one that functions as a brake. The meshing-type engagement device according to the invention may function as a clutch as well.

What is claimed is:

1. A meshing-type engagement device comprising:
   a first member provided with a plurality of first dog teeth at a first end of the first member, the plurality of first dog teeth being placed at regular intervals in a circumferential direction of the first member;
   a case which engages a second end of the first member in a non-rotatable manner, the case including an annular groove facing the second end of the first member;
   a second member provided with a plurality of second dog teeth, the plurality of second dog teeth being placed at regular intervals in a circumferential direction of the second member;
   a pressing mechanism configured to press the first member to a second member side when a fluid is provided to the annular groove of the case such that the first dog teeth are inserted between and mesh with the second dog teeth when the first member is pressed, the case and the first member constituting the pressing mechanism; and
   a reaction force mechanism configured to generate a reaction force with respect to a pressing force pressing the first member for the first dog teeth and the second dog teeth to mesh with each other such that an amount of increase in the reaction force with respect to a movement of the first member is larger at a position further on the second member side than a predetermined position compared to the amount of increase to the predetermined position when the first member is pressed, the predetermined position being a position achieved until the respective dog teeth begin to mesh with each other after the first member is pressed and begins to be moved toward the second member side,
   wherein the reaction force mechanism includes a first elastic member causing an elastic force to act on the first member regardless of the position of the first member and a second elastic member in contact with the first member and causing an elastic force to act on the first member in a case where the first member is moved to the predetermined position, a first end of the first elastic member being connected to a spring seat connected to the case and a second end of the first elastic member contacting a side surface of the first member, and a first end of the second elastic member being connected to the spring seat and a second end of the second elastic member contacting the side surface of the first member when the first member is moved to the predetermined position.

2. The meshing-type engagement device according to claim 1, wherein the first elastic member is longer than the second elastic member.

3. The meshing-type engagement device according to claim 1, wherein the second member includes a holding member connected to a carrier, a piston accommodated inside the holding member, and a third elastic member between a first side of the piston and the holding member, the second dog teeth being provided on a second side of the piston.

4. A meshing-type engagement device comprising:
   a first member provided with a plurality of first dog teeth, the plurality of first dog teeth being placed at regular intervals in a circumferential direction of the first member;
   a second member provided with a plurality of second dog teeth, the plurality of second dog teeth being placed at regular intervals in a circumferential direction of the second member;
   a pressing mechanism configured to press the first member to a second member side such that the first dog teeth are inserted between and mesh with the second dog teeth when the first member is pressed; and
   a reaction force mechanism configured to generate a reaction force with respect to a pressing force pressing the first member for the first dog teeth and the second dog teeth to mesh with each other such that an amount of increase in the reaction force with respect to a movement of the first member is larger at a position further on the second member side than a predetermined position compared to the amount of increase to the predetermined position when the first member is pressed, the predetermined position being a position achieved until the respective dog teeth begin to mesh with each other after the first member is pressed and begins to be moved toward the second member side, wherein the reaction force mechanism includes a first elastic member causing an elastic force to act on the first member regardless of the position of the first member, and a second elastic member in contact with the first member and causing an elastic force to act on the first member in a case where the first member is moved to the predetermined position, wherein the first dog teeth and the second dog teeth are separated by a torque being transmitted for the rotational speed of the second member to be reduced, and wherein the meshing-type engagement device further comprises a holding member configured to being brought into contact with the second member when the torque is transmitted so that the rotational speed of the second member is reduced.

5. The meshing-type engagement device according to claim 4, wherein the first elastic member is longer than the second elastic member.

6. The meshing-type engagement device according to claim 4, wherein the second member includes the holding member connected to a carrier, a piston accommodated inside the holding member, and a third elastic member between a first side of the piston and the holding member, the second dog teeth being provided on a second side of the piston.

* * * * *